(12) United States Patent
Gong et al.

(10) Patent No.: US 12,272,657 B2
(45) Date of Patent: Apr. 8, 2025

(54) RRAM FILAMENT LOCATION FOR PHYSICALLY UNCLONABLE FUNCTION

(71) Applicant: International Business Machines Corporation, Armonk, NY (US)

(72) Inventors: Nanbo Gong, White Plains, NY (US); Takashi Ando, Eastchester, NY (US); Guy M. Cohen, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 17/652,242

(22) Filed: Feb. 23, 2022

(65) Prior Publication Data

US 2023/0268292 A1  Aug. 24, 2023

(51) Int. Cl.
*G06F 21/75* (2013.01)
*G06F 21/44* (2013.01)
*H01L 23/00* (2006.01)

(52) U.S. Cl.
CPC ............ *H01L 23/573* (2013.01); *G06F 21/44* (2013.01); *G06F 21/75* (2013.01)

(58) Field of Classification Search
CPC ......... H01L 23/573; G06F 21/44; G06F 21/75
See application file for complete search history.

(56) References Cited

U.S. PATENT DOCUMENTS

| | | |
|---|---|---|
| 8,680,906 B1 | 3/2014 | McDonald et al. |
| 8,982,647 B2 | 3/2015 | Nazarian et al. |
| 9,588,908 B2 | 3/2017 | Cambou |
| 10,572,190 B2 | 2/2020 | Shieh et al. |
| 12,087,397 B1* | 9/2024 | Asnaashari ........... G06F 3/0655 |
| 2014/0269004 A1* | 9/2014 | Pramanik ................ H01L 28/60 365/148 |
| 2020/0169423 A1 | 5/2020 | Cambou et al. |
| 2020/0394115 A1* | 12/2020 | Pao ...................... G11C 11/4072 |
| 2022/0044727 A1* | 2/2022 | Cambou ............ G11C 13/0059 |
| 2022/0263022 A1* | 8/2022 | Pesic .................... G11C 11/5614 |
| 2022/0406999 A1* | 12/2022 | Jiang ..................... H10N 70/066 |
| 2023/0046138 A1* | 2/2023 | Kao ....................... H04L 9/0866 |
| 2023/0050978 A1* | 2/2023 | Chih ....................... H10D 30/62 |
| 2023/0063248 A1* | 3/2023 | Cheng ................... H10D 30/43 |
| 2023/0085995 A1* | 3/2023 | Ando ..................... H01L 23/57 257/5 |

(Continued)

FOREIGN PATENT DOCUMENTS

| | | |
|---|---|---|
| CN | 109495272 B | 4/2021 |
| JP | 2020031297 A | 2/2020 |

OTHER PUBLICATIONS

Chen, A., "Utilizing the Variability of Resistive Random Access Memory to Implement Reconfigurable Physical Unclonable Functions," in IEEE Electron Device Letters, vol. 36, No. 2, pp. 138-140, Feb. 2015, doi: 10.1109/LED.2014.2385870.

(Continued)

*Primary Examiner* — Stephen T Gundry
(74) *Attorney, Agent, or Firm* — Stosch Sbo (57) ABSTRACT

A method for system authentication includes subjecting a system to a challenge. The method further includes receiving a response from the system. The received response is dependent upon a location of a filament in a resistive random-access memory device of the system. Additionally, the response is also a unique identifier.

8 Claims, 6 Drawing Sheets

(56) References Cited

U.S. PATENT DOCUMENTS

| | | | | |
|---|---|---|---|---|
| 2023/0109660 A1* | 4/2023 | Ando | ................... | H10N 70/063 257/4 |
| 2023/0134437 A1* | 5/2023 | Nardi | .................. | G11C 11/5628 365/189.011 |
| 2023/0136317 A1* | 5/2023 | Song | .................. | G11C 13/0069 365/148 |
| 2023/0140134 A1* | 5/2023 | Jiang | .................. | H10N 70/8416 257/4 |
| 2023/0147275 A1* | 5/2023 | Kuo | ....................... | H10N 70/25 257/5 |
| 2023/0170019 A1* | 6/2023 | Stellari | ................ | H10N 70/826 365/148 |
| 2023/0186061 A1* | 6/2023 | Rummens | ............ | G11C 13/004 706/25 |
| 2023/0217843 A1* | 7/2023 | Sun | ...................... | H10N 70/826 257/3 |
| 2023/0274773 A1* | 8/2023 | Gong | ................. | G11C 11/2257 365/145 |
| 2023/0301217 A1* | 9/2023 | Miyazoe | ............ | H10N 70/8265 257/4 |
| 2023/0353352 A1* | 11/2023 | Mossayebi | ............ | H04L 9/3278 |
| 2024/0347480 A1* | 10/2024 | Kozicki | ................ | H01L 23/544 |

OTHER PUBLICATIONS

Gong et al., "Multi-Level Ferroelectric Field-Effect Transistor Devices," U.S. Appl. No. 17/119,032, filed Dec. 11, 2020.

Lee et al., "Enhanced Reconfigurable Physical Unclonable Function Based on Stochastic Nature of Multilevel Cell RRAM," in IEEE Transactions on Electron Devices, vol. 66, No. 4, pp. 1717-1721, Apr. 2019, doi: 10.1109/TED.2019.2898455.

Shimizu, T., "Ferroelectricity in HfO2 and related ferroelectrics," Journal of the Ceramic Society of Japan 126 [9] 667-674, 2018, http://doi.org/10.2109/jcersj2.18104.

Simpson, J., "Three Technologies U.S. Defense Agencies Are Using to Battle Counterfeit Chips," https://www.sourcetoday.com/industries/three-technologies-us-defense-agencies-are-using-battle-counterfeit-chips, Apr. 4, 2017, 3 pgs.

\* cited by examiner

RRAM FILAMENT LOCATION FOR PHYSICALLY UNCLONABLE FUNCTION

BACKGROUND

The present disclosure relates to the electrical, electronic, and computer fields. In particular, the present disclosure relates to cybersecurity and system authentication.

System authentication enables confirmation of the identities of parties who desire to communicate electronically to provide security to the parties before and/or during transmission and/or reception of data. Identities are assigned representations, which are used to verify authenticity. To enhance security, the representations should be difficult to guess or reproduce by inauthentic parties.

SUMMARY

Embodiments of the present disclosure include a method for system authentication. The method includes subjecting a system to a challenge and receiving a response from the system. The response is dependent upon a location of a filament in a resistive random-access memory device of the system. Additionally, the response is a unique identifier.

Additional embodiments of the present disclosure include a semiconductor device. The semiconductor device includes a resistive random-access memory device. The semiconductor device further includes a non-volatile memory heat sensing device arranged relative to the resistive random-access memory device such that localized heat generated by forming a filament in the resistive random-access memory device causes a detectable change in a portion of the non-volatile memory heat sensing device.

Additional embodiments of the present disclosure include a method of forming a physically unclonable function. The method includes forming a first bottom electrode and a second bottom electrode. The method further includes forming a non-volatile memory heat sensing device in electrical contact with the first and second bottom electrodes. The method further includes forming a middle electrode in electrical contact with the non-volatile memory heat sensing device. The method further includes forming a resistive random-access memory device in electrical contact with the middle electrode. The method further includes forming a top electrode in electrical contact with the resistive random-access memory device. The method further includes preparing a portion of the non-volatile memory heat sensing device. The method further includes forming a filament in the resistive random-access memory device. The method further includes reading the non-volatile memory heat sensing device to determine a location of the filament. The location of the filament provides the physically unclonable function.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Aspects of the present disclosure relate generally to the electrical, electronic, and computer fields. In particular, the present disclosure relates to cybersecurity and system authentication. While the present disclosure is not necessarily limited to such applications, various aspects of the disclosure may be appreciated through a discussion of various examples using this context.

Various embodiments of the present disclosure are described herein with reference to the related drawings. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements. It should be noted, the term "selective to," such as, for example, "a first element selective to a second element," means that a first element can be etched, and the second element can act as an etch stop.

Turning now to an overview of technologies that are more specifically relevant to aspects of the present disclosure, system authentication enables confirmation of the identities of parties who desire to communicate electronically to provide security to the parties before and/or during transmission and/or reception of data. Identities are assigned representations, which are used to verify authenticity. To enhance security, the representations should be difficult to guess or reproduce by inauthentic parties.

One way to provide authentication includes storing representations of such identities in memory elements. However, such methods are subject to degradation of the memory elements and are only as secure as the memory elements themselves. Additionally, the identity representations are artificially programmed into such memory elements, which makes them susceptible to copying.

In contrast, physically unclonable functions (PUFs) are physical structures in which identities can be embodied. Accordingly, PUFs avoid the problems introduced by storing representations of the identities in memory elements. PUFs can be thought of as "digital fingerprints," each providing a physically stable unique identifier that is not predictable.

PUFs depend on the uniqueness of their physical microstructure. In particular, a physical stimulus is applied to the structure of the PUF (a challenge), and the PUF reacts in an unpredictable but repeatable way (a response) due to the complex interaction of the stimulus with the unique physical microstructure of the PUF. There are various sources of physical uniqueness that are inherently introduced into a semiconductor device during fabrication processes. To be used as a PUF, an aspect of a physical microstructure should be stable over time, unique so that no two PUFs are the same, difficult to replicate so the PUF cannot be copied, and very difficult or impossible to predict so the responses cannot be guessed. Notably, the microstructure itself is not revealed by the PUF's response, which further contributes to the security of the device.

PUFs are used to translate an input challenge into an output response through a physical system in a manner that is specific to the exact hardware instance (and is therefore unique) and cannot be replicated (and is therefore unclonable). This allows the system, and by extension any object or device it is attached to or embedded within, to be uniquely authenticated. More specifically, at the point of manufacture, the system is subjected to one or more challenges, and the responses to these challenges are recorded. From then on, the device can be verified if one of the challenges is repeated and the expected response is received. This importance of this ability to verify that semiconductor components are authentic is becoming increasingly apparent as semiconductor supply chain integrity is a vital security need, and the loss of trusted foundries in the United States underscores the need to verify that chips installed in critical systems are authentic. For example, phony components, if substituted for real ones, can contain malicious circuitry enabling loss of functionality or security.

As noted above, there are a number of physical attributes of a device that can be used for a PUF. Some currently known attributes are formed in non-volatile memory devices of a semiconductor device. For example, it is possible to apply a modified write signal to a unit cell of memory that causes the memory cell to have an unpredictable chance of being written into either the 0 or 1 state (similar to flipping a coin), building up a random pattern. This could be considered as the combined equivalent of a random number generator and non-volatile storage to retain a random key. Due to the non-volatility of this memory type, the pattern of writing remains until deliberately reset. However, the resistive state of the memory cell is not completely stable over time and cycling, and therefore is vulnerable to failure as a PUF.

Embodiments of the present disclosure may overcome these and other drawbacks of existing solutions by using the location of a filament in a resistive random access memory (RRAM or ReRAM) device for a PUF. The location of a filament formed in a RRAM device is hardwired to the RRAM material and is more stable than the resistive state. Accordingly, embodiments of the present disclosure provide significant improvement in long-term stability for a PUF, thereby facilitating multi-level cell PUFs which enable even greater security. Although electrically forming a filament in a RRAM device for a memory or analog computing application is a known process, detecting the location of such a filament enables embodiments of the present disclosure. As discussed in further detail below, embodiments of the present disclosure utilize localized heat generated by forming the filament in the RRAM device for some other type of readout of non-volatile memory. This other type of readout identifies the location of the filament in the RRAM device, and the location of the filament in the RRAM device can be used for a PUF.

Figure 1:
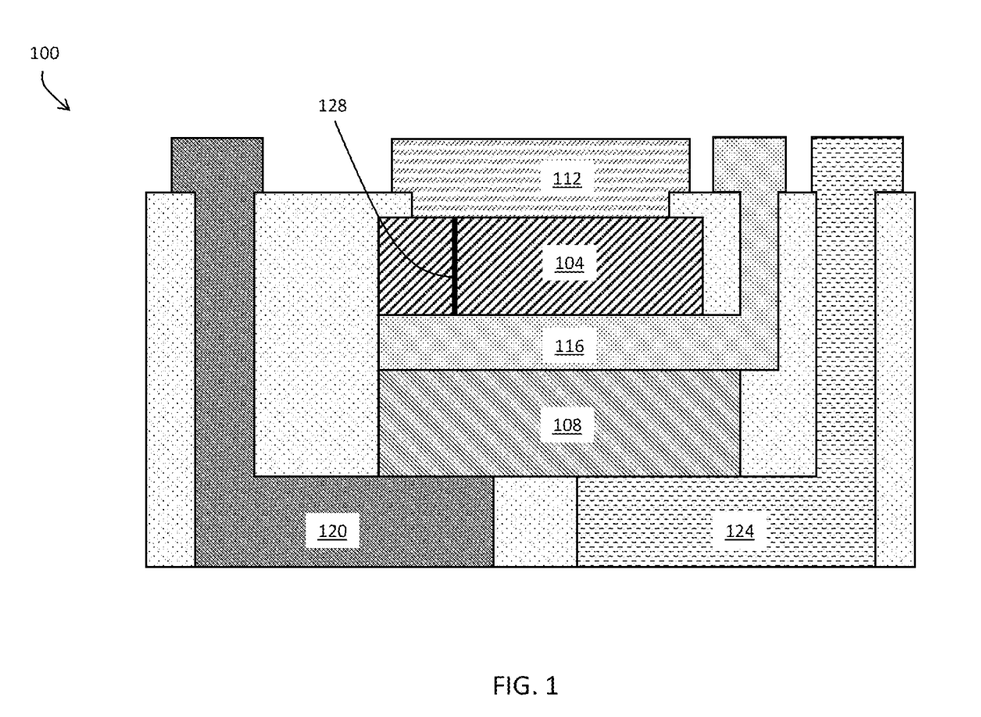
FIG. 1 is a schematic diagram illustrating a front cross-sectional view of an example semiconductor device, in accordance with embodiments of the present disclosure.

FIG. 1 depicts an example semiconductor device 100 according to embodiments of the present disclosure. The semiconductor device 100 includes a RRAM device 104 and a heat sensing non-volatile memory (NVM) device 108. The RRAM device 104 is arranged between a top electrode 112 and a middle electrode 116, and the heat sensing NVM device 108 is arranged between the middle electrode 116 and first and second bottom electrodes 120, 124. Accordingly, the RRAM device 104 and the heat sensing NVM device 108 functionally share the middle electrode 116. In other words, both the RRAM device 104 and the heat sensing NVM device 108 are impacted by the middle electrode 116.

FIG. 1 depicts one RRAM device. However, in accordance with some embodiments of the present disclosure, the semiconductor device 100 may include multiple RRAM devices. Each heat sensing NVM device 108 is aligned with a corresponding RRAM device 104. Accordingly, for embodiments including more than one RRAM device 104, the semiconductor device includes a heat sensing NVM device 108 corresponding to each RRAM device 104.

The RRAM device 104 is a type of non-volatile random-access memory (RAM) device that works by changing the electrical resistance across a dielectric solid-state material. More specifically, RRAM involves generating defects in a thin oxide layer, known as oxygen vacancies, which can subsequently charge and drift under an electric field. The motion of oxygen ions and vacancies in the oxide layer is analogous to the motion of electrons and holes in a semiconductor. The dielectric, which is normally insulating, can be made to conduct through a filament or conduction path formed by the application of a sufficiently high voltage. In particular, during application of the sufficiently high voltage, the dielectric will be increasingly biased until it begins to break down, creating a localized conduction path. The localized conduction path is also referred to as a filament.

In the arrangement shown in FIG. 1, a filament 128 can be formed in the RRAM device 104 by applying a sufficiently high voltage between the top electrode 112 and the middle electrode 116. The application of such a voltage to form a filament can be referred to as "forming." Forming is a stochastic process. As a result, the location in the dielectric material of the RRAM device 104 at which the filament 128 is formed is random and unpredictable. Once the filament 128 has been formed in the RRAM device 104, its location is permanently fixed.

As discussed in further detail below, localized heat is generated during the forming process. This localized heat affects the heat sensing NVM device 108, which is on the opposite side of the middle electrode 116, by depolarizing dipoles in the heat sensing NVM device 108. This effect on the NVM device 108 is utilized to determine the location of the filament 128.

In the semiconductor device 100 shown in FIG. 1, the RRAM device 104 and corresponding heat sensing NVM device 108 are arranged such that the filament 128 can be formed in the dielectric material of the RRAM device 104 by grounding the middle electrode 116 and the first and second bottom electrodes 120, 124 and biasing the top electrode 112.

In accordance with at least one alternative embodiment of the present disclosure, each RRAM device 104 can be replaced with a conductive-bridging RAM (CBRAM) device (also referred to as a programmable metallization cell device). In contrast to RRAM, CBRAM involves one electrode providing ions that dissolve readily in an electrolyte material. CBRAM's redox (reduction-oxidation)-based electrochemistry relies on the fact that some amorphous materials with relatively large amounts of metal can behave as solid electrolytes. Under a voltage bias, metal ions in such an insulating amorphous layer can be reduced to form a conductive filament, or pathway, through it. The conductive filament can then be used in the same manner as the filament 128 in the RRAM device 104 described above.

As shown in FIG. 1, the middle electrode 116, which is used to apply forming voltage to the RRAM device 104, is also utilized by the heat sensing NVM device 108. The heat sensing NVM device 108 is a heat sensing device based on a material with a non-volatile memory property. A non-volatile memory refers to memory that is capable of retaining stored information even after power is removed. In other words, the material of the heat sensing NVM device 108 can be referred to as "remembering" exposure to heat.

In the embodiment shown in FIG. 1, the heat sensing NVM device 108 includes a ferroelectric tunnel junction (FTJ). Ferroelectricity is a characteristic of certain materials that have a spontaneous electric polarization that can be reversed by the application of an external electric field. The distinguishing feature of ferroelectrics is that the spontaneous polarization can be reversed by a suitably strong applied electric field in the opposite direction. Accordingly, the polarization is dependent not only on the current electric field but also on its history.

Typically, materials demonstrate ferroelectricity only below a certain phase transition temperature, called the Curie temperature ($T_C$). Above this temperature, the spontaneous polarization vanishes, and the ferroelectric crystal transforms into a paraelectric state. In an FTJ, a contact is made by a nanometer-thick ferroelectric film between metal electrodes. The thickness of the ferroelectric layer is small enough to allow tunneling of electrons therethrough.

In the arrangement shown in FIG. 1, the FTJ of the heat sensing NVM device 108 can be polarized and depolarized by applying a voltage between the middle electrode 116 and the first and second bottom electrodes 120, 124. More specifically, in the semiconductor device 100 shown in FIG. 1, the RRAM device 104 and corresponding heat sensing NVM device 108 are arranged such that the dipoles in the ferroelectric layer of the heat sensing NVM device 108 can be polarized by grounding the top electrode 112 and the middle electrode 116 and biasing the first and second bottom electrodes 120, 124.

Additionally, the RRAM device 104 and corresponding heat sensing NVM device 108 are arranged such that the dipoles in the ferroelectric layer of the heat sensing NVM device 108 can be depolarized by grounding the middle electrode 116 and the first and second bottom electrodes 120, 124 and biasing the top electrode. As noted above, the filament 128 is also formed in the dielectric material of the RRAM device 104 by grounding the middle electrode 116 and the first and second bottom electrodes 120, 124 and biasing the top electrode 112. Accordingly, the act of forming the filament 128 in the RRAM device 104 also depolarizes dipoles in the heat sensing NVM device 108.

More specifically, during the forming of the filament 128 in the dielectric material of the RRAM device 104, the localized high temperature generated by the voltage being applied between the top electrode 112 and the middle electrode 116 is greater than the Curie temperature of the ferroelectric material in the NVM device 108. Therefore, the act of forming the filament 128 also depolarizes dipoles in the ferroelectric layer of the heat sensing NVM device 108 at the location of the localized heat generation where the filament 128 was formed. The read current of the heat sensing NVM device 108 is affected by the polarization distribution of the ferroelectric layer. Accordingly, subsequently comparing read currents detected by the first and second bottom electrodes 120, 124 reveals the location of the depolarized dipoles in the heat sensing NVM device 108, which reveals the location of the filament 128.

The read current for the FTJ of the heat sensing NVM device 108 can be detected using the first and second bottom electrodes 120, 124. More specifically, in the semiconductor device 100 shown in FIG. 1, the RRAM device 104 and corresponding heat sensing NVM device 108 are arranged such that the heat sensing NVM device 108 can be read by grounding the top electrode 112 and the middle electrode 116 and biasing the first and second bottom electrodes 120, 124.

In the arrangement shown in FIG. 1, where the RRAM device 104 and corresponding heat sensing NVM device 108 functionally share the middle electrode 116, the location of the filament 128 in the dielectric material of the RRAM device 104 can be detected by comparing the intensities of the read currents from the first and second bottom electrodes 120, 124 of the heat sensing NVM device 108. Notably, the dipoles in the ferroelectric layer of the heat sensing NVM device 108 must be polarized prior to the formation of the filament 128 in order for the depolarization of dipoles in the ferroelectric layer to be detectable and therefore indicate the location of the filament 128.

For embodiments including multiple RRAM devices, a filament can be formed in each RRAM device, and the location of each filament will be random in its respective RRAM device. Accordingly, by utilizing multiple such semiconductor elements in an array, row, or column, the random locations of multiple filaments can be taken together for a PUF. Therefore, embodiments of the present disclosure use the location of the filament, rather than the resistive state of a RRAM device, to store information for a PUF. Because the location of each filament is fixed within the dielectric material of the RRAM device, this physical characteristic is more stable, and therefore more reliable, than the resistive state.

Figure 2:
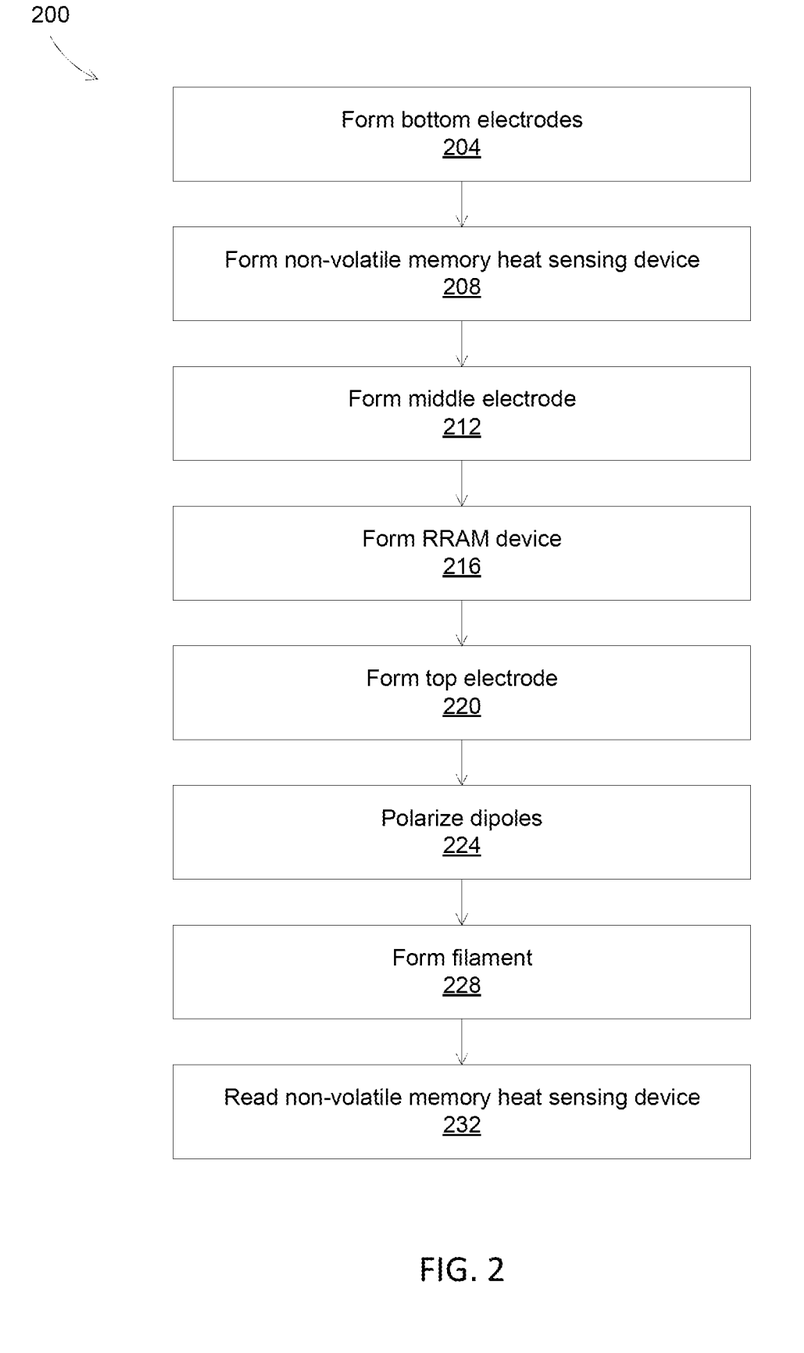
FIG. 2 illustrates a flowchart of an example method for forming a semiconductor device, in accordance with embodiments of the present disclosure.

FIG. 2 depicts a flowchart of an example method 200 of forming a PUF, such as that shown in the semiconductor device 100 of FIG. 1, according to embodiments of the present disclosure. The method 200 begins with the performance of operation 204, wherein first and second bottom electrodes are formed. The method 200 proceeds with the performance of operation 208, wherein a non-volatile memory heat sensing device is formed in electrical contact with the first and second bottom electrodes. In accordance with at least one embodiment of the present disclosure, the non-volatile memory heat sensing device includes an FTJ.

The method 200 proceeds with the performance of operation 212, wherein a middle electrode is formed in electrical contact with the non-volatile memory heat sensing device. The method 200 proceeds with the performance of operation 216, wherein a RRAM device is formed in electrical contact with the middle electrode. The method 200 proceeds with the performance of operation 220, wherein a top electrode is formed in electrical contact with the RRAM device.

In accordance with at least one alternative embodiment of the present disclosure, the performance of operation 216 includes the formation of a CBRAM device instead of a RRAM device. In such embodiments, the performance of operation 220 includes forming the top electrode in electrical contact with the CBRAM device instead of the RRAM device.

The method 200 proceeds with the performance of operation 224, wherein dipoles of the non-volatile memory heat sensing device are polarized. In accordance with at least one embodiment of the present disclosure, the performance of operation 224 includes grounding the top electrode and the middle electrode and biasing the first and second bottom electrodes with the same bias.

The method 200 proceeds with the performance of operation 228, wherein a filament is formed in the RRAM device. In accordance with at least one embodiment of the present disclosure, the performance of operation 228 includes grounding the middle electrode and the first and second bottom electrodes and biasing the top electrode. Notably, grounding the middle electrode and the first and second bottom electrodes and biasing the top electrode also depolarizes a portion of the dipoles that were polarized in the performance of operation 224. In particular, those dipoles in the portion of the non-volatile memory heat sensing device that is arranged beneath the filament formed in the RRAM device are subject to higher temperatures generated by the voltage applied between the top electrode and the middle electrode due to the conductive pathway established by the filament. This localized higher temperature depolarizes those dipoles.

The method 200 proceeds with the performance of operation 232, wherein the non-volatile memory heat sensing device is read to determine a location of the filament. The location of the filament provides the PUF. In accordance with at least one embodiment of the present disclosure, the performance of operation 232 includes grounding the top electrode and the middle electrode and biasing the first and second bottom electrodes. In accordance with at least one embodiment of the present disclosure, the performance of operation 232 further includes detecting a first current from the first bottom electrode and detecting a second current from the second bottom electrode. The location of the filament is determined by comparing the first and second currents.

Figure 3:
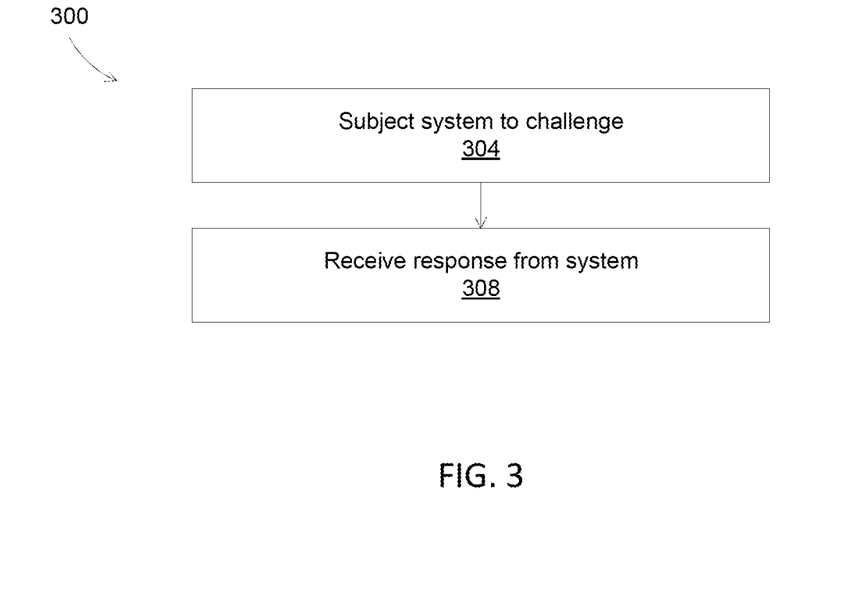
FIG. 3 illustrates a flowchart of an example method for using a semiconductor device for system authentication, in accordance with embodiments of the present disclosure.

FIG. 3 depicts a flowchart of an example method 300 for authenticating a system, such as one including the semiconductor device 100 shown in FIG. 1, according to embodiments of the present disclosure. The method 300 begins with the performance of operation 304, wherein a system including a PUF is subjected to a challenge. The method 300 proceeds with the performance of operation 308, wherein a response is received from the system. According to embodiments of the present disclosure, the response is dependent upon a location of a filament in a RRAM device of the system. The location of the filament is the PUF. Accordingly, the response is an unpredictable unique identifier. In accordance with at least one embodiment of the present disclosure, the location of the filament can be represented by an analog value.

In accordance with at least one embodiment of the present disclosure, the performance of operation 308 includes comparing an intensity of a read current from a first electrode with an intensity of a read current from a second electrode. In accordance with at least one embodiment of the present disclosure, the first and second electrodes are included in a non-volatile memory heat sensing device of the system. In accordance with at least one embodiment of the present disclosure, the non-volatile memory heat sensing device can be a ferroelectric tunnel junction device, a ferroelectric field-effect transistor, or a phase change memory device.

In accordance with at least one embodiment of the present disclosure, prior to the performance of operation 304, the method 300 further includes forming the filament in the RRAM device of the system. In such embodiments, forming the filament depolarizes dipoles in the non-volatile memory heat sensing device.

In accordance with at least one embodiment of the present disclosure, prior to forming the filament in the RRAM device of the system, the method 300 further includes polarizing dipoles in the non-volatile memory heat sensing device. As noted above, because forming the filament depolarizes some of the dipoles in the non-volatile memory heat sensing device, in order for that depolarization to be detectable, the dipoles must have first been polarized.

Figure 4:
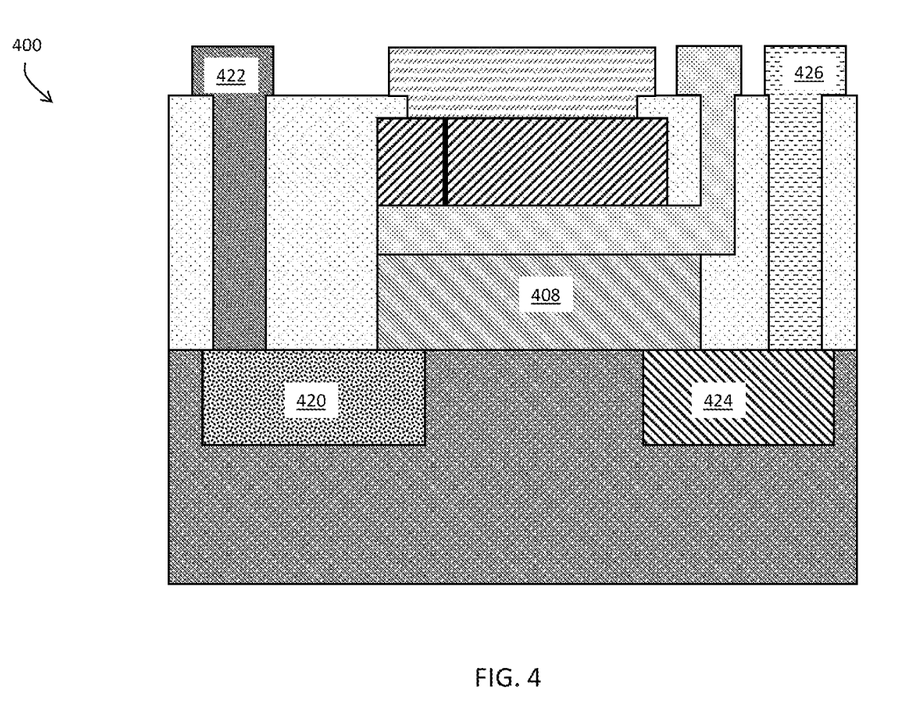
FIG. 4 is a schematic diagram illustrating a front cross-sectional view of an example semiconductor device, in accordance with embodiments of the present disclosure.

FIG. 4 depicts an example semiconductor device 400 according to embodiments of the present disclosure. The semiconductor device 400 is substantially similar in structure and function to the semiconductor device 100 described above with reference to FIG. 1. The semiconductor device 400 differs from the semiconductor device 100 in that the semiconductor device 400 includes a ferroelectric field-effect transistor (FeFET) instead of an FTJ. Like the semiconductor device 100, the semiconductor device 400 still relies on the properties and behaviors of ferroelectricity. However, the FeFET in the NVM device 408 enables the semiconductor device 400 to utilize a readout that is more similar to that of a transistor.

More specifically, the NVM device 408 includes a ferroelectric oxide layer, the first bottom electrode includes a source 420 coupled to a source electrode 422, and the second bottom electrode includes a drain 424 coupled to a drain electrode 426. The flow of current through the NVM device 408 is controlled by application of a voltage to the ferroelectric oxide layer, which alters the conductivity between the drain 424 and the source 420. Electrical field polarization in the ferroelectric material causes the NVM device 408 to retain the transistor's state (on or off) in the absence of any electrical bias.

Accordingly, as in the NVM device 108, the information is still stored within the polarization in the ferroelectric oxide of the NVM device 408. However, unlike the NVM device 108, the readout of the NVM device 408 is more like a transistor. The current is read in a direction (source to drain or drain to source), and the threshold voltage of the transistor is determined by the polarized state within the ferroelectric oxide. Thus, for embodiments of the disclosure including and/or utilizing the NVM device 408, the device is read in a saturation mode of the transistor.

For example, to read the FeFET, the threshold voltage of the FeFET (Vth) is subtracted from the gate to source voltage (Vgs), and the result is less than the drain to source voltage (Vds). The FeFET is first read in a first direction under saturation mode and a first read current is detected. The FeFET is then read in a second direction under saturation mode with the same Vgs and Vds applied to the source, drain, and gate as for the first read current, and a second read current is detected. In the second direction, the source and drain are reversed relative to the first direction. Because in a saturation mode of the transistor, the near-drain side channel is punch-off, so Vth is a function of polarization distribution within the ferroelectric oxide that is near the source side, when the device is read from one direction and the other, the Vth is different, accordingly. Therefore, by detecting the read current from one direction and then the other, it is possible to use the difference to determine where the filament is located.

Figure 5:
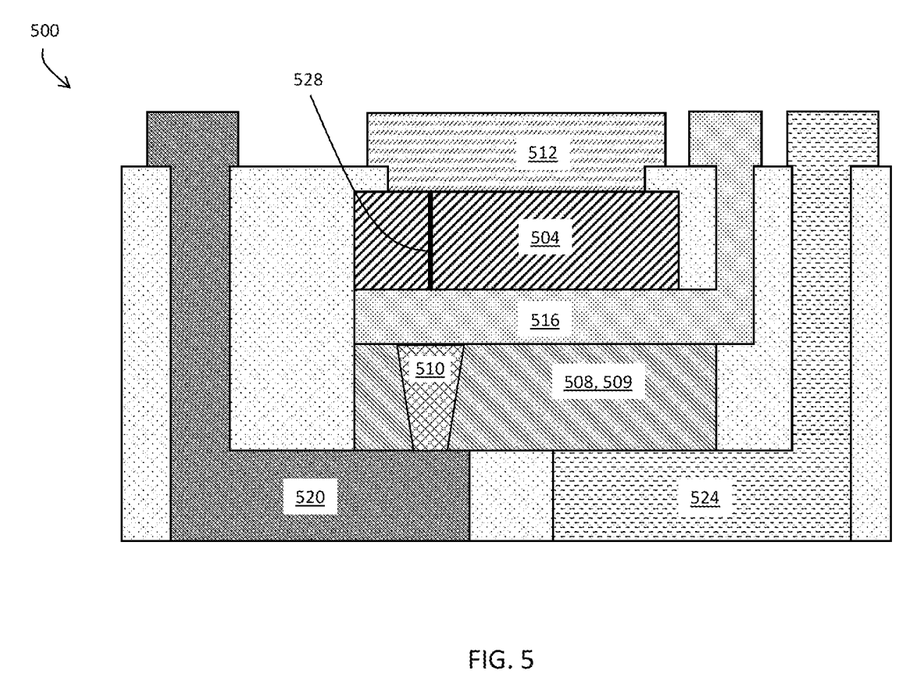
FIG. 5 is a schematic diagram illustrating a front cross-sectional view of an example semiconductor device, in accordance with embodiments of the present disclosure.

FIG. 5 depicts an example semiconductor device 500 according to embodiments of the present disclosure. The semiconductor device 500 is substantially similar in structure and function to the semiconductor device 100 described above with reference to FIG. 1. The semiconductor device 500 differs from the semiconductor device 100 in that the semiconductor device 500 includes a phase-change memory (PCM) device instead of an FTJ. More specifically, the NVM device 508 includes a layer of phase-change material in which heat produced by the passage of an electric current through a heating element is used to either quickly heat and quench the phase-change material, causing it to be in an amorphous state 509, or to hold it in its crystallization temperature range for some time, thereby switching it to a crystalline state 510.

Phase-change material in the amorphous state 509 is in a high-resistance state, and phase-change material in the crystalline state 510 is in a low-resistance state. Therefore, information can be stored in the phase-change material wherein material that is in the crystalline state has a low resistance and is therefore able to be represented by a 0. Conversely, material that is in the amorphous state has a high resistance and is therefore able to be represented by a 1. Programming the phase-change material from the crystalline state to the amorphous state is referred to as a "reset" operation, and programming the phase-change material from the amorphous state to the crystalline state is referred to as a "set" operation.

To program the PCM device, heat having a certain heat profile is applied to the phase-change material. This heat is generated by the application of a certain current. In such embodiments the localized heat generated by forming the filament in the RRAM device 504 can transform the state of a portion of the phase-change material from amorphous to crystalline or crystalline to amorphous, depending on its heat profile. In other words, the heat generated by forming the filament 528 can either set or reset the portion of the phase-change material that is impacted by the localized heat. If the portion is reset by the localized heat, it will be transformed into the amorphous state and will have a higher resistance. If the portion is set by the localized heat, it will be transformed into the crystalline state and will have a lower resistance.

For embodiments of the present disclosure which include and/or utilize a PCM device in the NVM device 508, the phase-change material can be set or reset by grounding the top electrode 512 and the middle electrode 516 and biasing the first and second bottom electrodes 520, 524 with the same bias. The filament 528 is then formed in the RRAM device 504 by grounding the middle electrode 516 and the first and second bottom electrodes 520, 524 and biasing the top electrode 512. Forming the filament 528 also changes the resistance of the phase-change material in the PCM device. As discussed above, changing the resistance of the phase-change material can include resetting a portion of the phase-change material or setting a portion of the phase-change material in the PCM device, depending on the heat profile that is generated while forming the filament 528. The PCM device can then be read by grounding the top electrode 512 and the middle electrode 516 and biasing the first and second bottom electrodes 520, 524 with different biases to detect different currents which can then be compared to determine the location of the filament 528.

Figure 6A:
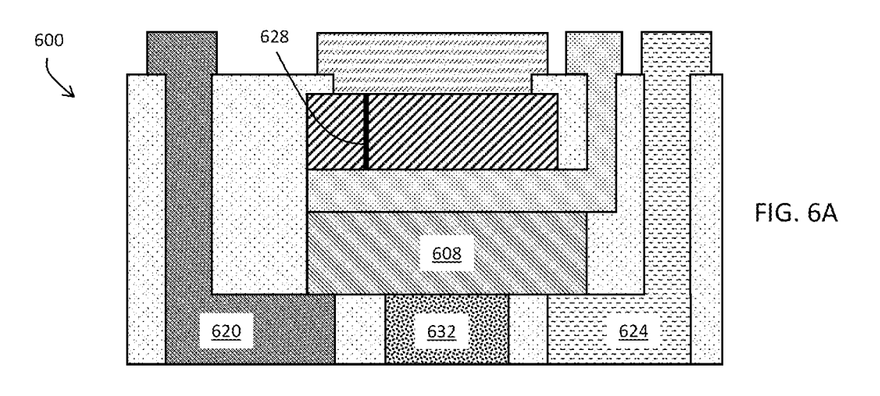
FIG. 6A is a schematic diagram illustrating a front cross-sectional view of an example semiconductor device, in accordance with embodiments of the present disclosure.
Figure 6B:
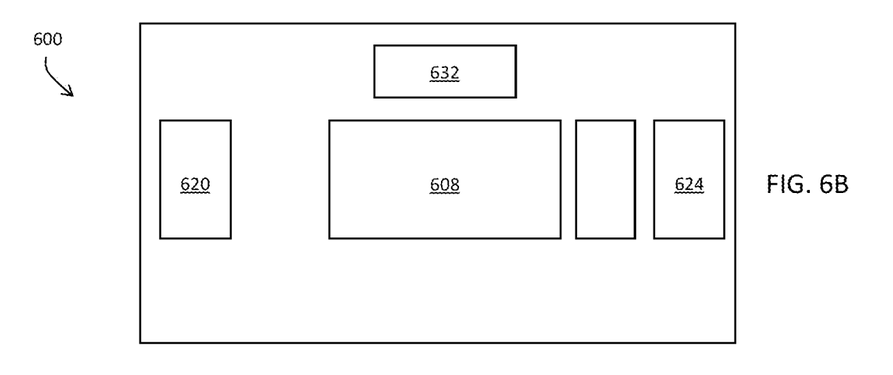
FIG. 6B is a schematic diagram illustrating a top plan view of the example semiconductor device shown in FIG. 6A, in accordance with embodiments of the present disclosure.

FIGS. 6A and 6B depict an example semiconductor device 600 according to embodiments of the present disclosure. The semiconductor device 600 is substantially similar in structure and function to the semiconductor device 100 described above with reference to FIG. 1. In the semiconductor device 600, the NVM device 608 can include an FTJ or a PCM device. The semiconductor device 600 differs from the semiconductor device 100 in that the semiconductor device 600 includes a third bottom electrode 632 in addition to the first and second bottom electrodes 620, 624.

More specifically, FIG. 6A depicts a cross-sectional view of the semiconductor device 600, which shows the arrangement of the third bottom electrode 632 between the first and second bottom electrodes 620, 624 in contact with the bottom of the NVM device 608. Accordingly, FIG. 6A indicates how the third bottom electrode 632 can be functionally included in contact with the bottom of the NVM device 608, thereby providing an additional read current option. This enables more accurate determination of the location of the filament 628. Accordingly, in such embodiments, because more information regarding the location of the filament 628 is able to be detected, more information regarding the location of the filament 628 is able to be used for a PUF.

FIG. 6B depicts a top plan view of the semiconductor device 600, which shows the arrangement of the third bottom electrode 632 having extended laterally relative to the first and second bottom electrodes 620, 624 before extending vertically to the top of the device 600. Accordingly, FIG. 6B indicates how the third bottom electrode 632 can be accommodated in the semiconductor device 600 without interfering with the other structures.

In addition to embodiments described above, other embodiments having fewer operational steps, more operational steps, or different operational steps are contemplated. Also, some embodiments may perform some or all of the above operational steps in a different order. Furthermore, multiple operations may occur at the same time or as an internal part of a larger process.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used, and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for system authentication, the method comprising:
    subjecting a system to a challenge; and
    receiving a response from the system, wherein:
    the response is dependent upon a location of depolarized dipoles in a non-volatile memory heat sensing device, and wherein the location of the depolarized dipoles is dependent upon a location of a filament in a resistive random-access memory device of the system, and
    the response is a unique identifier.

2. The method of claim 1, wherein:
    the location of the filament is represented by an analog value.

3. The method of claim 1, wherein:
    receiving the response includes comparing an intensity of a read current from a first electrode with an intensity of a read current from a second electrode.

4. The method of claim 3, wherein:
    the first electrode and the second electrode are included in the non-volatile memory heat sensing device of the system.

5. The method of claim 1, wherein:
    the non-volatile memory heat sensing device is a ferroelectric tunnel junction device.

6. The method of claim 1, wherein:
    the non-volatile memory heat sensing device is a ferroelectric field-effect transistor.

7. The method of claim 1, wherein:
    the non-volatile memory heat sensing device is a phase change memory device.

8. The method of claim 1, wherein the system comprises multiple resistive random-access memory devices collectively having a plurality of filaments, wherein the response indicates a plurality of locations of the plurality of filaments, and wherein the unique identifier is based on the plurality of locations of the plurality of filaments.

* * * * *